United States Patent
Johansson (10) Patent No.: US 12,082,520 B2
(45) Date of Patent: Sep. 10, 2024

(54) DEVICE, METHOD, METER HOUSING AND AGRICULTURAL IMPLEMENT FOR AIRFLOW ASSISTED FEEDING OF GRANULAR MATERIAL IN AN AGRICULTURAL IMPLEMENT

(71) Applicant: Väderstad Holding AB, Väderstad (SE)

(72) Inventor: Björn Johansson, Motala (SE)

(73) Assignee: Väderstad Holding AB, Väderstad (SE)

( * ) Notice: Subject to any disclaimer, the term of this patent is extended or adjusted under 35 U.S.C. 154(b) by 351 days.

(21) Appl. No.: 17/604,032

(22) PCT Filed: Apr. 15, 2020

(86) PCT No.: PCT/SE2020/050388
§ 371 (c)(1),
(2) Date: Oct. 15, 2021

(87) PCT Pub. No.: WO2020/214077
PCT Pub. Date: Oct. 22, 2020

(65) Prior Publication Data
US 2022/0192078 A1     Jun. 23, 2022

(30) Foreign Application Priority Data
Apr. 16, 2019    (SE) .................................. 1950476-0

(51) Int. Cl.
*A01C 7/08*     (2006.01)
*A01C 7/10*     (2006.01)
(Continued)

(52) U.S. Cl.
CPC .............. *A01C 7/082* (2013.01); *A01C 7/102* (2013.01); *A01C 15/04* (2013.01); *A01M 9/003* (2013.01)

(58) Field of Classification Search
CPC ......... A01C 7/082; A01C 7/102; A01C 15/04; A01C 7/081; A01C 7/10; A01M 9/003
See application file for complete search history.

(56) References Cited

U.S. PATENT DOCUMENTS 539,722  A    5/1895  Bock
4,280,419 A *  7/1981 Fischer .................. A01C 7/044
                                                       406/137
(Continued)

FOREIGN PATENT DOCUMENTS

EP     1591000 A1    11/2005
EP     2591656 A1    5/2013
(Continued)

*Primary Examiner* — Donnell A Long
(74) *Attorney, Agent, or Firm* — COATS & BENNETT, PLLC (57) ABSTRACT

This document concerns a device for airflow-assisted feeding of granular material in an agricultural implement, comprising an air inlet (1611, 1612), a material inlet (167), and an outlet (162) for material-laden airflow, a roof (163), the horizontal extension of which defines a material pickup zone (160), wherein the material inlet (167), air inlet (1611, 1612) and outlet (162) are connected to the material pickup zone (160), wherein the device furthermore comprises an air inlet valve (164) containing a valve seat (1641) and a valve body (1642). The valve body is rotatable about a geometric axis which is substantially perpendicular to a flow direction at the air inlet. The document also concerns a method for airflow-assisted feeding of material in an agricultural implement, a meter housing, and an agricultural implement comprising such a meter housing. It also concerns a frame for a material pickup module and a method for forming a meter housing.

15 Claims, 9 Drawing Sheets

(51) Int. Cl.
   *A01C 15/04*   (2006.01)
   *A01M 9/00*   (2006.01)

(56) References Cited

U.S. PATENT DOCUMENTS

| | | | |
|---|---|---|---|
| 4,296,695 A * | 10/1981 | Quanbeck | A01C 15/04 |
| | | | 111/178 |
| 5,024,356 A * | 6/1991 | Gerling | A01C 7/102 |
| | | | 222/312 |
| 5,161,473 A | 11/1992 | Landphair et al. | |
| 5,996,515 A | 12/1999 | Gregor et al. | |
| 6,253,693 B1 | 7/2001 | Mayerle et al. | |
| 6,609,468 B1 | 8/2003 | Meyer et al. | |
| 6,935,256 B1 | 8/2005 | Meyer | |
| 9,468,141 B2 | 10/2016 | Audigie et al. | |
| 10,820,491 B2 * | 11/2020 | Kowalchuk | A01C 23/007 |
| 2005/0172873 A1 | 8/2005 | Mayerle | |
| 2005/0235890 A1 | 10/2005 | Mariman et al. | |
| 2006/0042529 A1 | 3/2006 | Johnson et al. | |
| 2007/0022928 A1 * | 2/2007 | Kowalchuk | A01C 7/082 |
| | | | 111/175 |
| 2014/0193214 A1 | 7/2014 | Johnson et al. | |
| 2015/0296703 A1 | 10/2015 | Audigie et al. | |
| 2017/0055436 A1 * | 3/2017 | Thompson | A01C 7/081 |
| 2017/0055437 A1 * | 3/2017 | Thompson | A01C 7/081 |
| 2017/0086353 A1 | 3/2017 | Borkgren et al. | |
| 2017/0318737 A1 * | 11/2017 | Gilstring | A01C 7/082 |
| 2019/0380263 A1 * | 12/2019 | Harmon | A01C 7/124 |
| 2020/0205337 A1 * | 7/2020 | Millie | A01C 7/20 |

FOREIGN PATENT DOCUMENTS

| | | |
|---|---|---|
| EP | 2724600 A1 | 4/2014 |
| EP | 3003004 A1 | 4/2016 |
| WO | 2013130005 A1 | 9/2013 |
| WO | 2013180619 A1 | 12/2013 |
| WO | 2014080147 A1 | 5/2014 |
| WO | 2016072922 A1 | 5/2016 |

* cited by examiner

DEVICE, METHOD, METER HOUSING AND AGRICULTURAL IMPLEMENT FOR AIRFLOW ASSISTED FEEDING OF GRANULAR MATERIAL IN AN AGRICULTURAL IMPLEMENT

TECHNICAL FIELD

This document concerns a metering device for feeding granular material by means of an airflow, and an agricultural implement comprising such a metering device.

The document also concerns a method for feeding granular material by means of an airflow to an agricultural implement.

The document furthermore concerns a meter housing comprising a plurality of such metering devices, and an agricultural implement comprising such a meter housing.

Furthermore, a frame is disclosed for a material pickup module which is used to form the metering device cited initially, and a method for forming such a meter housing.

Specific applications of the concept presented here include so-called nursing systems for distribution of granular material in an agricultural implement, such as a seed drill, a precision seed drill, a fertilizer spreader or a pesticide spreader, and in particular to such pneumatically assisted feeding of the granular material.

BACKGROUND

WO2016072922A1 discloses a metering device of the type cited initially. Specifically, this metering device comprises a material inlet which is configured to connect to an outlet from a material container, and a plurality of material pickup zones arranged side by side, from which a material-laden airflow is fed via respective channels to seed tubes, or to row units in the case where the metering device is used to supply a plurality of row units in a precision seed drill.

Each material pickup zone extends between an air inlet and an outlet and has a roof. Between each adjacent pair of material pickup zones is a gap which allows the material to fall down from a material inlet, which is fed by gravity from a material container, between the roofs into the material pickup zones where it is carried to the outlet by the airflow.

WO2016072922A1 discloses a plurality of ways of adjusting the quantity of material picked up by the airflow.

Further ways of adjusting the quantity of material picked up by an airflow are disclosed in US2015296703A1 and in EP2591656A1.

While the basic principle of the method shown in WO2016072922A1 for controlling the quantity of material picked up has been found to function well, there is a need to achieve a simpler and more robust way of performing such control.

SUMMARY

One object is therefore to produce an improved metering device. A specific object is to produce a metering device which is simpler and more robust.

The invention is defined by the appended independent claims. Embodiments arise from the dependent claims, the description below and the drawings.

According to a first aspect, a device is provided for airflow-assisted feeding of granular material in an agricultural implement, comprising an air inlet, a material inlet, and an outlet for material-laden airflow; a roof, the horizontal extension of which defines a material pickup zone; wherein the material inlet, air inlet and outlet connect to the material pickup zone; wherein the device furthermore comprises an air inlet valve comprising a valve seat and a valve body. The valve body is rotatable about a geometric axis which is substantially perpendicular to a flow direction at the air inlet.

The device may constitute a material pickup module intended to be joined to one or more similar material pickup modules in order to form a meter housing.

An "air inlet valve" is a valve which controls the inflow of air into the air inlet.

The term "a" in this document means "one or more".

A device as described above may be produced with a minimum of moving parts. Because the valve body is arranged so as to be rotatable, there is a reduced risk that particles such as dust and waste product could have a negative effect on the mobility of the valve. Thus a device is created which is robust, simple to install, simple to handle and simple to maintain.

The geometric axis may preferably be substantially horizontal so as to create a device which is easy to install.

The device is primarily used to dispense granular material in the form of seed, but may also be used for granular material in the form of fertilizer or pesticide.

The material pickup zone may have a substantially horizontal floor surface.

The floor surface may extend along a flow direction between the air inlet and outlet and up to the material inlet.

The air inlet may be opened in the horizontal direction +/−45 degrees, preferably +/−30 degrees.

The air inlet may comprise a first portion which can is adjustable by the air inlet valve, and a second portion which is opened independently of the air inlet valve.

The outlet may be opened in a horizontal direction +/−45 degrees, preferably +/−30 degrees.

The air inlet and outlet may be situated on mutually opposite sides of the material pickup zone.

The material inlet may be open in a direction transversely to a flow direction from the air inlet to the outlet.

The material inlet may be open on both sides of a flow path from the air inlet to the outlet.

The material inlet may be opened in a horizontal direction +/−45 degrees, preferably +/−30 degrees.

The roof may have a downwardly extending wall portion, a lower edge of which constitutes an upper limit of the material inlet.

The valve seat may have a substantially part-cylindrical surface.

The term "part-cylindrical" means that there is a surface which coincides with a casing surface of the cylinder without necessarily extending for a full turn around the central axis of such a cylinder and without necessarily having a regular form.

The valve body may have a first portion which is substantially cylindrical and a second portion which comprises a recess forming a channel across the geometric axis, wherein the second portion is alignable with the air inlet.

Preferably, the valve body may have some substantially cylindrical parts which are arranged on both sides, viewed in the axial direction, of the second portion.

The valve body may thus be generally cylindrical and have an indentation from the cylinder casing surface which forms a channel when the valve body is in the open or partially open state.

The recess, viewed in a plane containing the rotational axis of the valve body, may have a cross-sectional form which corresponds to a cross-sectional form of the air inlet.

The cross-sectional form of the recess may correspond to the cross-sectional form of the air inlet, at least in the fully open state of the valve, or to at least part of the air inlet.

The valve body may have a protrusion which extends across the geometric axis and forms an extension of at least a part of the cross-sectional form of the recess.

Specifically, the recess may form a channel in the direction across the axial direction of the valve body. The protrusion may extend parallel to this direction and across the axial direction of the valve body. The protrusion may help improve the capacity of the valve body to close the air inlet. Specifically, a large part of, but not the entire, air inlet may be closed, compared with the design without protrusion.

According to a second aspect, a method is provided for airflow-assisted feeding of granular material in an agricultural implement, comprising: providing a material pickup zone, the extension of which, viewed in the horizontal plane, is defined by a roof above the pickup zone; providing airflow through the material pickup zone in a direction towards an outlet from the material pickup zone; feeding the material by gravity to the material pickup zone, so that the material slides into the material pickup zone in a direction across the airflow; providing an air inlet valve comprising a valve seat and a valve body; turning the valve body about a geometric axis which is substantially perpendicular to a flow direction at the air inlet so as to control a flow area for the airflow to the material pickup zone; and conducting the material-laden airflow from the outlet to at least one distribution unit.

According to a third aspect, a meter housing is provided for airflow-assisted feeding of granular material to at least two distribution units in an agricultural implement, comprising at least two devices as described above which are arranged side by side, wherein the outlet from each device can be connected to at least one respective distribution unit, and wherein the roofs of the devices are situated at a sufficient distance from each other for the material to be able to fall down between the roofs of the devices and on to the material inlet of the devices.

A floor of the meter housing may form a common floor for said at least two devices.

Said floor may be openable for access to the meter housing from below.

For example, the floor may be mounted rotatably relative to the meter housing, and have a locking device which allows the floor to be locked in the closed position.

The valve bodies of the devices may be coupled together so that their rotations are mutually synchronized.

The valve bodies of the devices may have a common rotational axis.

The roofs of the devices may be separated by a gap which leads to the material inlet of the devices.

The meter housing air inlet may connect to a common space for air distribution, or to branches of a manifold system.

The air inlets may be separated from each other by partition walls.

Alternatively, at least two adjacent air inlets may be common, such that no partition wall separates them, so that one air inlet supplies at least two material pickup zones.

According to a fourth aspect, an agricultural implement is provided for feeding granular material to the ground over which the agricultural implement travels, comprising a central container for the granular material, a meter housing as described above, wherein the meter housing is connected to the container such that material present in the container is fed to the meter housing by force of gravity, a fan which is connected to the meter housing for generating an airflow to the air inlet, at least two distribution units which are located at a distance from the meter housing, wherein each outlet from the meter housing is connected to at least one of the distribution units via a respective channel.

According to a fifth aspect, a frame is provided for a material pickup module for forming a meter housing for feeding a material-laden airflow to one of at least two distribution units, comprising a first set of walls which forms an air feed space, a roof which defines a material pickup zone, an air inlet which connects the air feed space to the material pickup zone, an outlet for a material-laden airflow from the material pickup zone, wherein a flow direction for the material-laden airflow in the material pickup zone is defined as a direction from the air inlet to the outlet, a material inlet which connects to the material pickup zone and is open in the direction transversely to the flow direction, and a valve seat arranged at the air inlet.

The valve seat may have a part-cylindrical surface.

The air inlet may comprise a first portion, which is defined by an inlet opening at the valve seat, and a second portion which is situated outside the valve seat.

The frame may have a width viewed in a direction transversely to the flow direction, and the roof may have a width which is less than the frame width, so that when two such frames are joined side by side, a gap is formed between the roofs of the frames.

The frame may have at least one wall portion which forms a slide surface which terminates at the bottom against at least one of the roof and the material pickup zone.

According to a sixth aspect, a method is provided for forming a meter housing, comprising: providing a number of frames as described above, placing the frames side by side and aligned both in a direction parallel to the flow direction and in a vertical direction perpendicular to the flow direction, bringing at least one valve body into engagement with at least one of the valve seats of the frames, and joining the frames so that they are prevented from separating from each other.

BRIEF DESCRIPTION OF THE DRAWINGS

FIG. 1 shows a diagrammatic, perspective view of an agricultural implement comprising a central container and a plurality of row units which can be fed by means of a nursing system.

FIGS. 2*a*-2*b* show diagrammatic, perspective views of the metering system.

FIGS. 3*a*-3*b* show diagrammatic, sectional views of a meter housing according to a first embodiment.

FIGS. 4*a*-4*b* show diagrammatic, sectional views of a meter housing according to a second embodiment.

FIGS. 5*a*-5*b* show diagrammatic, perspective views of the meter housing with an open floor hatch.

FIG. 6 shows a diagrammatic, exploded sketch of a meter housing.

FIGS. 7*a*-7*b* show diagrammatic, perspective views of a valve body according to the first embodiment.

FIGS. 8*a*-8*b* show diagrammatic, perspective views of a valve body according to the second embodiment.

FIGS. 9*a*-9*b* show diagrammatic, perspective views of a frame for a metering module.

DETAILED DESCRIPTION

FIG. 1 shows an agricultural implement 1 in the form of a precision seed drill coupled to a towing vehicle 2 such as a tractor.

Figure 1:
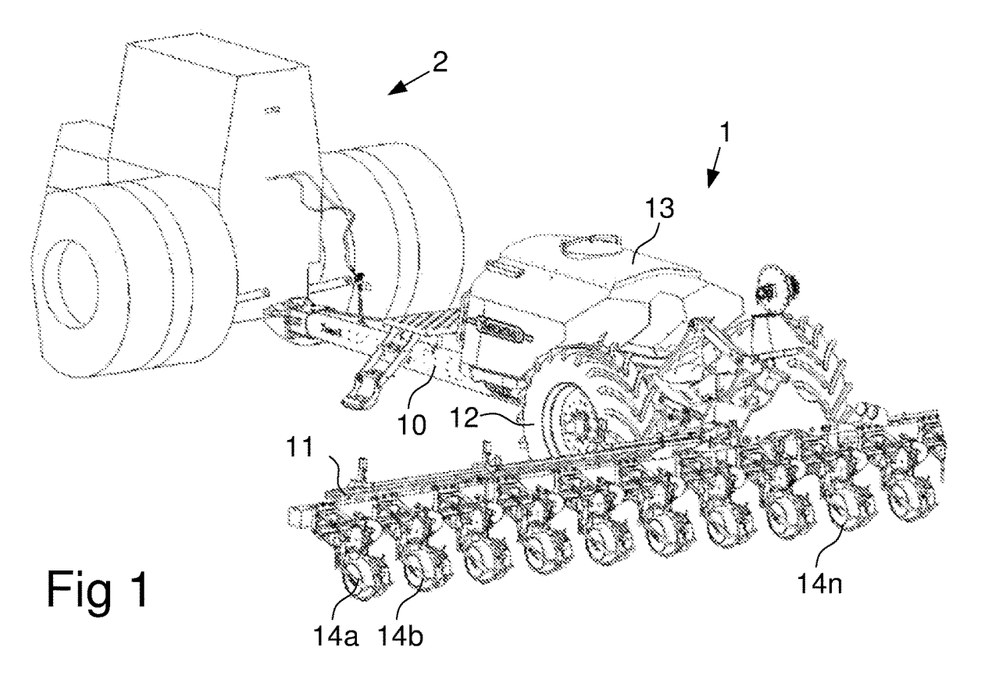

The agricultural implement 1 has a main frame 10, a transverse frame bar 11, a set of wheels 12 and a central container 13. The transverse frame bar 11 carries a plurality of row units 14a-14n, wherein n may be 6-30. The agricultural implement 1 furthermore has a fan (not shown) which may be arranged as a separate unit on the frame 10, 11, or integrated in the container 13 as shown in WO2013130005A1.

The container 13 may be of the pressurisable type so that a positive air pressure may be maintained in the container, to ensure that the air supplied to the meter housing is conducted via the material pickup zones and on to the respective outlet. For this purpose, the lid of the container may be sealed against the container filling opening.

Figure 2A:
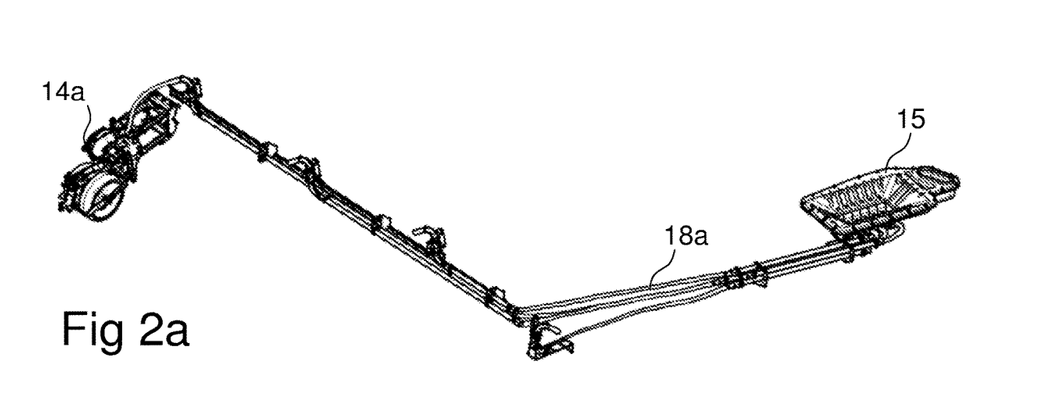
Figure 2B:
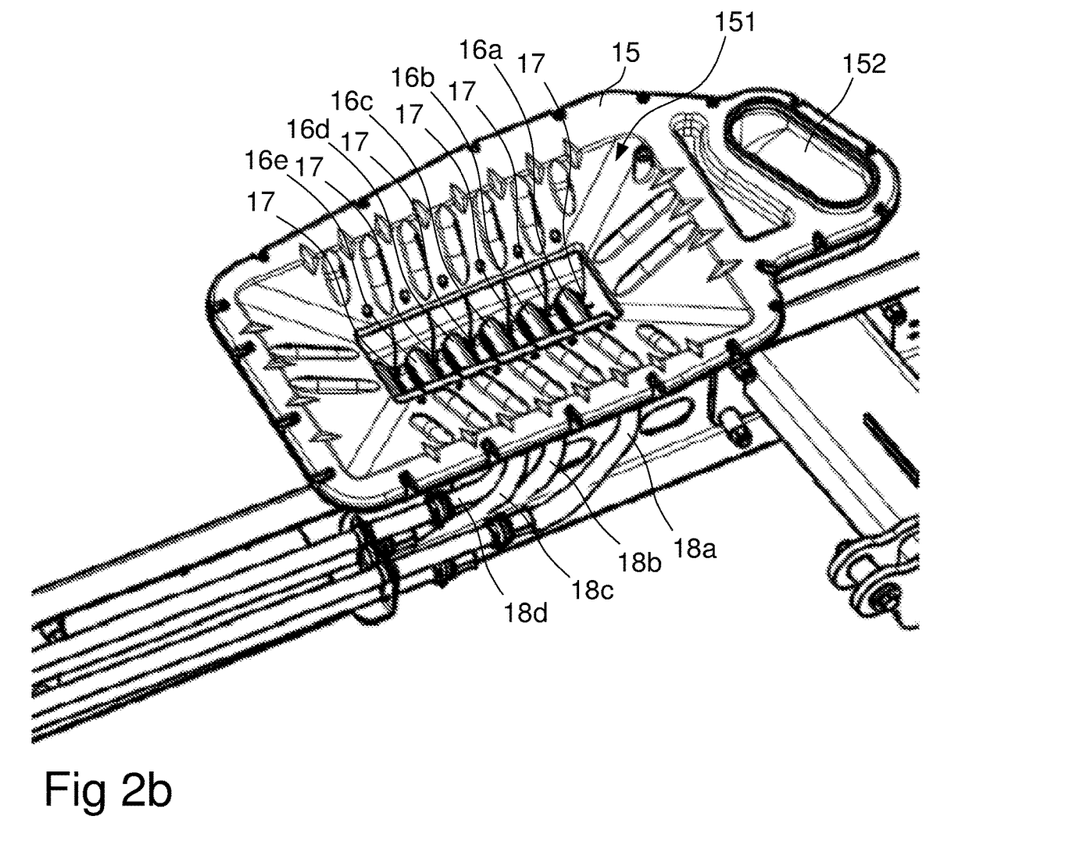

FIGS. 2a-2b show a metering system comprising a distributor 15, channels 18a, 18b, 18c, 18d and a row unit 14a. According to one embodiment, each of the channels 18a, 18b, 18c, 18d is connected to a respective row unit 14a-14n. Alternatively, one channel 18a, 18b, 18c, 18d may be connected to two or more row units 14a-14n via one or more branch couplings (not shown).

The distributor 15 is connected to an opening in the floor of the container 13 and has a material inlet 151, the walls of which form slide surfaces which slope downward to a material pickup zone comprising a plurality of material pickup modules 16a-16e which are separated by an intermediate space 17.

The distributor 15 may comprise a distributor inlet unit 153 and a meter housing 154.

The distributor inlet 153 may have a central air inlet 152 to which the fan (not shown) may be connected, either via a hose or directly in the case where the fan is integrated into the container 13 or distributor 15. The distributor inlet 153 may contain an air channel which conducts air from the air inlet 152 to the meter housing. The distributor inlet may also have slide surfaces which conduct material from the container 13 so that it slides down to the meter housing 154 under the force of gravity.

Each material pickup module 16a-16e is connected to one of the channels 18a, 18b, 18c, 18d.

Figure 3A:
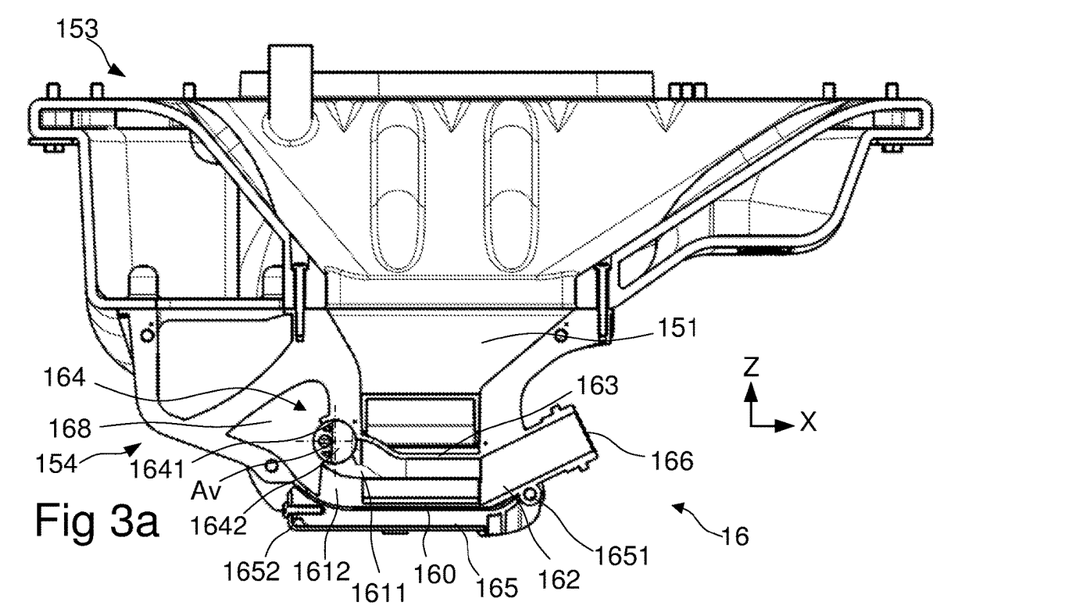
Figure 3B:
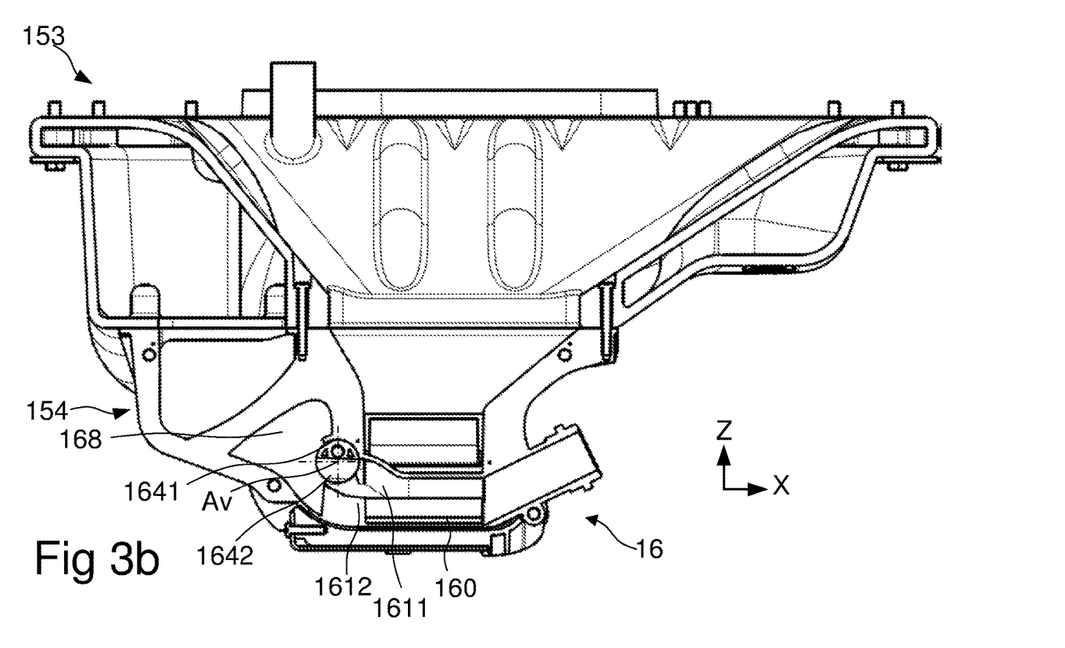

FIGS. 3a-3b show the distributor 15 in a cross-section along a plane through the centre of a material pickup module 16.

The material pickup module 16 comprises a material pickup zone 160 which has an air inlet 1611, 1612 and an outlet 162 for material-laden airflow, the horizontal extension of which is defined by a roof 163.

The air inlet may consist of two air inlet portions 1611, 1612, of which a first air inlet portion may be controllable and a second air inlet portion 1612 may be permanently open against an air feed channel 168. The air feed channel 168 may be common to a plurality of material pickup modules 16 and be connected to the air inlet 152 of the distributor 15.

The first air inlet portion 1611 may be arranged above the second air inlet portion. The air inlet may be open between the air inlet portions.

The air inlet comprises a valve 164 which has a valve seat 1641 and a valve body 1642, and which is configured to control the first air inlet portion 1611. The valve 164 may control the first air inlet portion between an open position and a closed position.

In the open position of the valve 164, both air inlet portions may be fully open.

In the closed position of the valve, according to the embodiment shown in FIGS. 3a-3b, the first air inlet portion 1611 may be fully closed and the second air inlet portion 1612 fully open.

In the fully closed position of the valve therefore, the flow area of the first air inlet portion may be blocked to 80 to 100%, preferably 90 to 100%.

Thus a total flow area for the sum of the two air inlet portions 1611, 1612 may be adjustable between being fully open (FIG. 3b) and being 30 to 60% open, preferably 40 to 50% open (FIG. 3a).

The material pickup zone 160 is open at the side (perpendicularly to the plane of the figure), preferably on both sides, so that material which is fed from the material inlet 151 of the distributor 15 falls down between the adjacent roofs 163 to land on the floor of the meter housing 154 between the material pickup zones, and then slide sideways down into the space 17 and on into the material pickup zone 160.

The floor 16541 of the material pickup zone may be substantially flat.

At an upstream portion of the floor next to the air inlet 1611, 1612, the material pickup zone may have a first ramp surface 16542 for connection to the air inlet. The first ramp surface may be linear or concave, viewed from above.

At a downstream portion of the floor next to the outlet 162, the material pickup zone may have a second ramp surface 16543 for connection to the outlet. The second ramp surface may be linear or concave, viewed from above.

FIGS. 3a-3b also show the floor hatch 165 which allows access from below to the material pickup module 16, for example for cleaning. The hatch 165 may be rotatable about a geometric axis 1651 and be provided with a locking mechanism 1652 which allows the hatch 165 to be locked in the closed position.

The outlet 162 may be connected to an outlet channel 166 which may be adapted for connection to the channels 18a, 18b, 18c, 18d which conduct the material-laden airflow to the row units 14a-14n. The channels 18a, 18b, 18c, 18d may the tubular and/or hose-like in shape, preferably with an inner diameter of 30 to 70 mm.

Figure 4A:
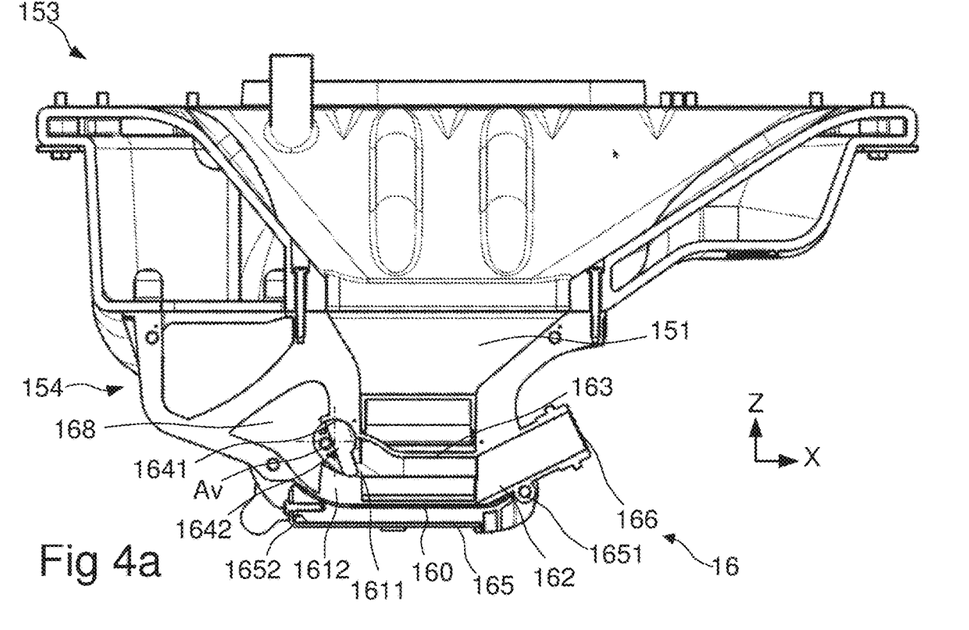
Figure 4B:
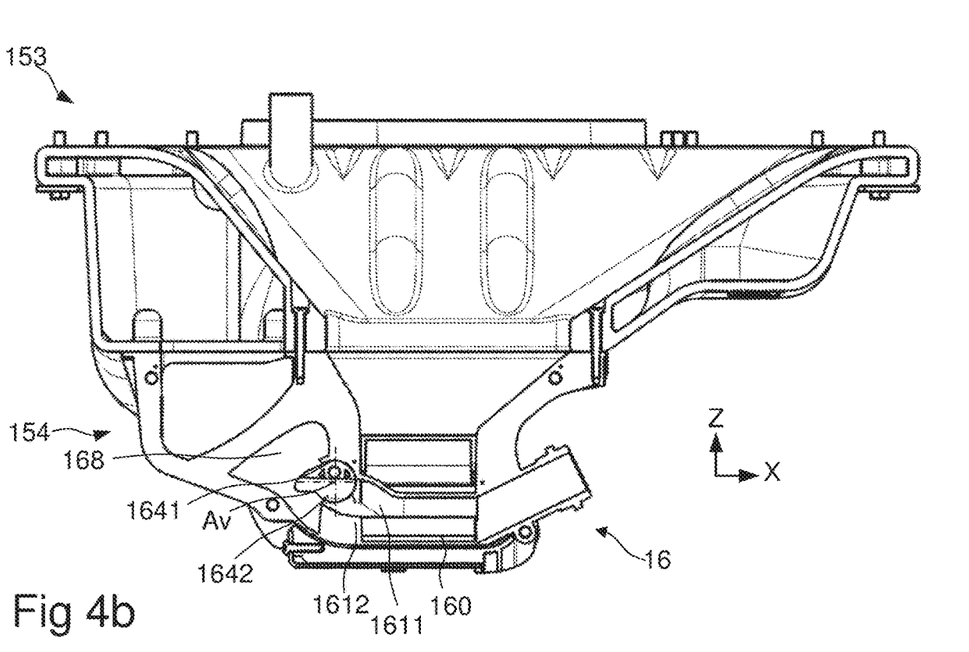

FIGS. 4a-4b show a material pickup module 16 with an alternative design of valve body 1642 which, in the closed position, closes a large proportion of the total flow area of the inlet portions 1611, 1612. This alternative design of the valve body is described in more detail with reference to FIGS. 8a-8b.

In the embodiment shown in FIGS. 4a-4b, in the closed position, part of the second air inlet portion 1612 may also be closed.

Figure 5A:
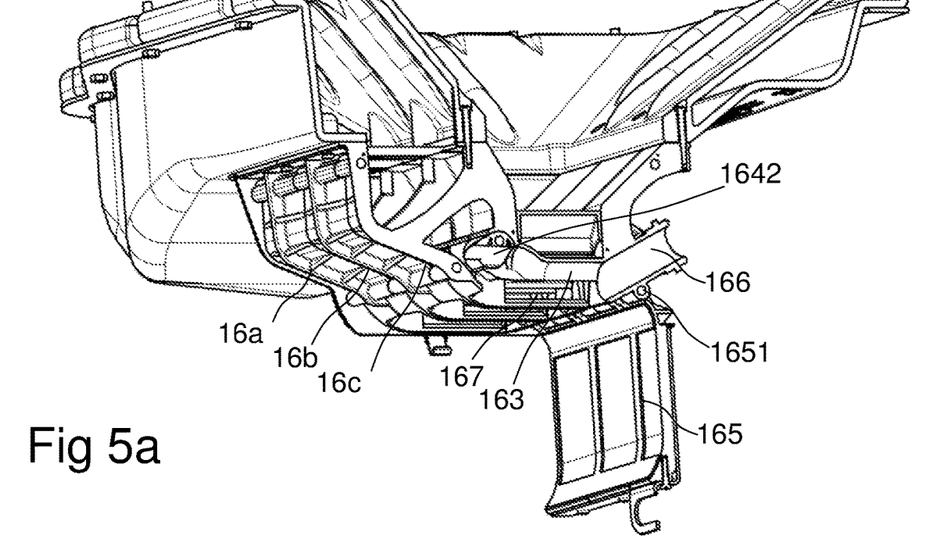
Figure 5B:
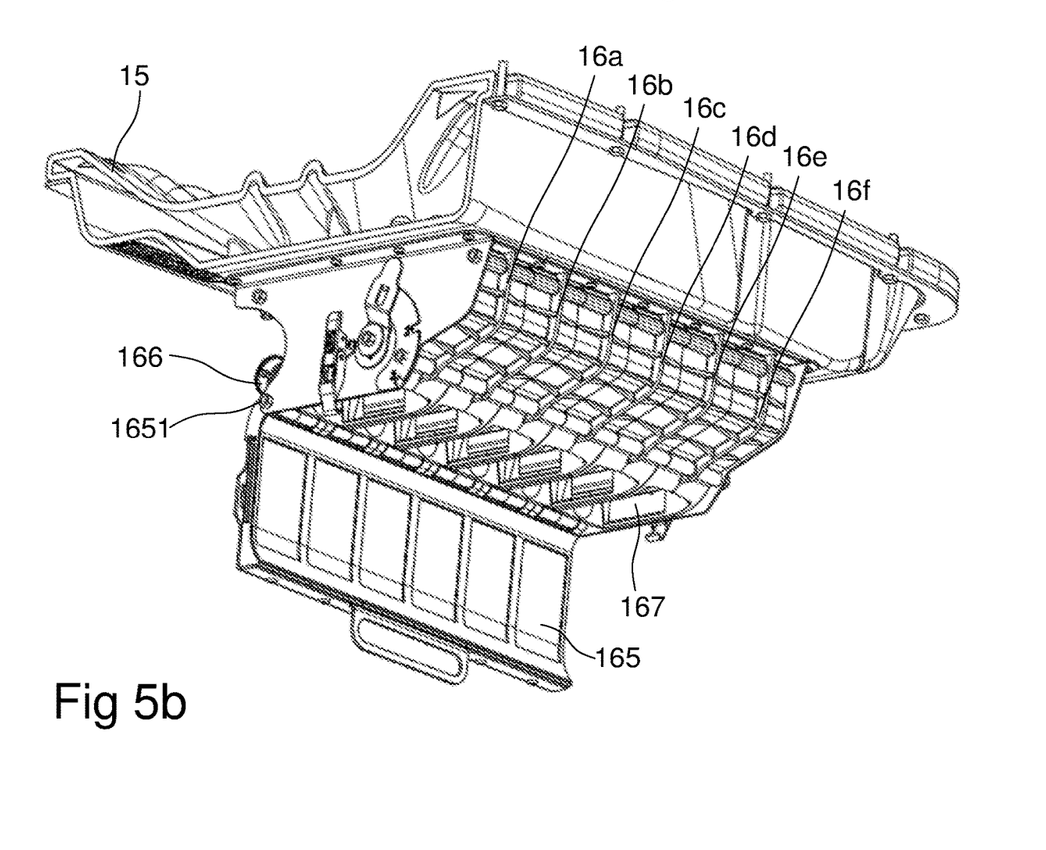

FIGS. 5a-5b show the distributor 15 in a perspective view from below with the hatch 165 open.

FIG. 5a shows a distributor 15 which is cut open so that two whole material pickup modules 16a, 16b are partially visible, and a third material pickup module 16c is visible in the form of a longitudinal vertical section showing the side opening 167 constituting the material inlet to the material pickup zone 160.

FIG. 5a also shows the valve body 1642 in the open position.

Figure 6:
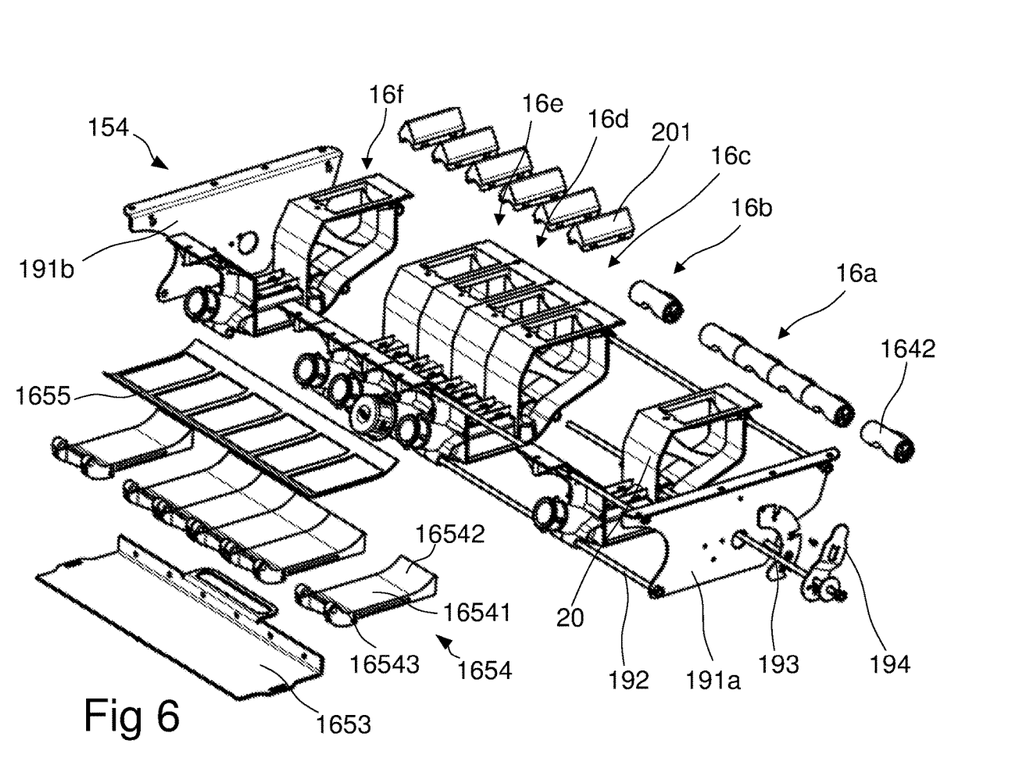

FIG. 6 shows an exploded sketch of the meter housing 154 which is constructed from a plurality of material pickup modules 16a-16f. Each of the material pickup modules 16a-16f comprises a material pickup module frame 20, a valve body 1642 and in some cases a module roof 201.

The module roof 201 may be produced as a detachable part which is mounted on the roof 163 by means of a snap fastening. Alternatively, the module roof 201 may be integrated with the material pickup module frame 20. With such integration, a specially shaped inner roof can be produced.

The purpose of the above-mentioned two roofs 163, 201 is to ensure that that an outer roof creates desirable conditions for the material to slide onto the respective side of the roof, while at the same time an inner roof gives an optimal shape for the air and material flow to be propelled through the material pickup zone 160.

As a further alternative, only one roof may be formed which fulfils both functions sufficiently well. Such a roof may be formed in one piece with the remainder of the frame 16.

The material pickup modules 16a-16f are aligned with each other and mounted side by side, and are fixed together by a pair of outer brackets 191a, 191b and by means of rods 192, which run through corresponding recesses 203 in each material pickup module frame 20 and are fixed to the respective outer bracket 191a, 191b, for example by means of nuts.

A common valve shaft 193, which may have a non-circular cross-section, may be arranged to run through the rotational centre Av of all valve bodies 1642, so that the rotational position of the valve bodies may be set jointly by turning the valve shaft 193. The position of the valve shaft 193 may be adjustable by means of actuator 194, which may comprise a lever arm for manual adjustment or an actuator for numerically controlled adjustment. In the latter case, a sensor for the angular position of the valve shaft may also be provided, in order to provide feedback to a control unit.

FIG. 6 also shows that the hatch 165 is made of three parts: an outer hatch 1653, an inner hatch 1654 which creates the correct shape for the floor 16541, 16542, 16543 of the material pickup zone 160, and a seal 1655 which seals between the meter housing and the hatch.

The seal may be formed so that it extends only sufficiently to seal between the hatch 165 and the frame of the meter housing where they meet. A cutout in the seal 1655 may thus be formed, which corresponds to the position and extension of the material pickup zone 160. The seal 1655 may also be configured to seal the joint formed between the adjacent inner hatches 1654.

As evident from the example shown, the meter housing 154 is formed from a plurality of modules, wherein each module is formed by a module frame 20, and wherein also the inner hatches 1654 have a width which corresponds to the width of the module frame 20. This gives a flexibility in the form of the meter housing, wherein only the outer hatch 1653, the seal 1655, and the length of the rods 192 and of the valve shaft 193 need be unique to the width of the meter housing. Otherwise, the meter housing may be formed with the desired number of modules. The typical number of modules may be 4-10, preferably 6-8.

Figure 7A:
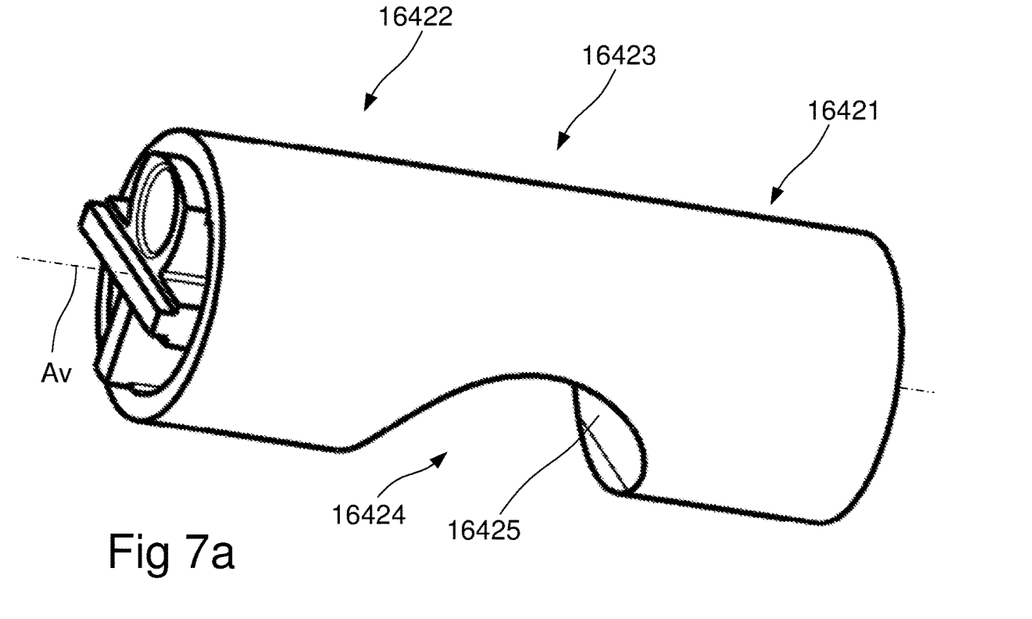
Figure 7B:
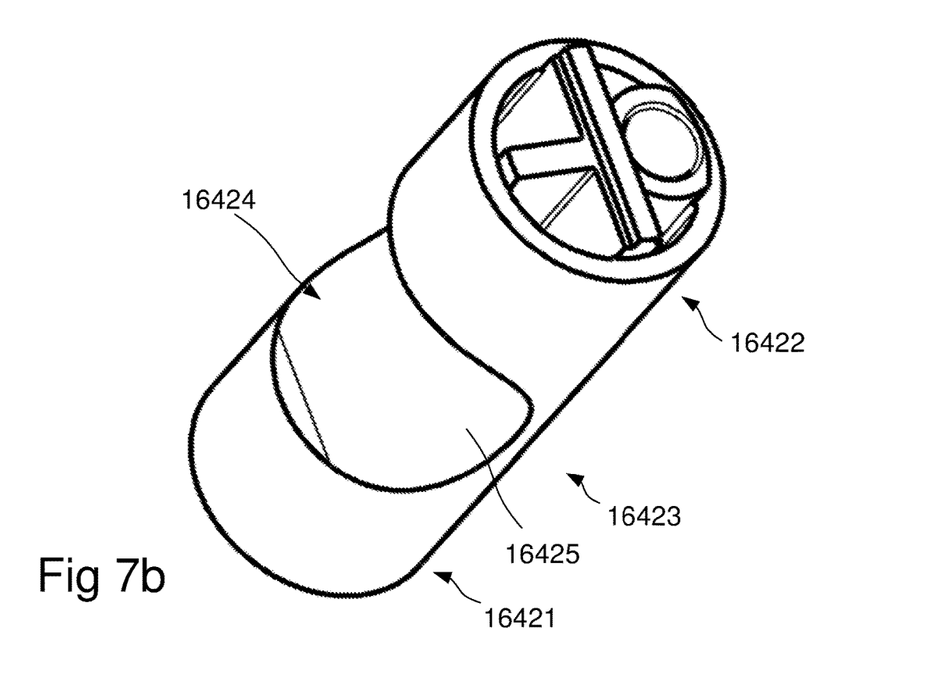

FIGS. 7a and 7b show a valve body according to the first embodiment (FIGS. 3a-3b).

The valve body 1642 is generally cylindrical and comprises two cylindrical portions 46421, 46422 and a third portion 46423 which has a recess 16424 relative to the cylindrical portion. The recess thus extends inward from the casing surface of the valve body.

The recess 16424 may define a direction which extends substantially perpendicularly to a geometric rotational axis Av for the valve body 1642. The recess may thus form a channel which may be substantially straight and have a substantially constant cross-sectional area, apart from the variation in edges which occurs as a result of the curvature of the portions 16421, 16422.

Viewed in a plane containing the geometric rotational axis Av, the surface 16425 of the recess may have a shape which corresponds to the shape of the air inlet 1611. For example, this shape may be partially circular such as semicircular, or partially oval. The shape may extend over the entire width of the valve body so as to form a channel which runs across the axial direction of the valve body.

Alternatively, the recess may for example have a partially oval or partially polygonal cross-sectional form.

The recess may form a continuous channel, i.e. a channel which, viewed in its flow direction, is fully surrounded by the valve body material at least at some part along the flow direction.

Alternatively and as shown in FIGS. 3a-3b, the recess may form an open channel, i.e. a channel which is open along its entire flow direction.

Figure 8A:
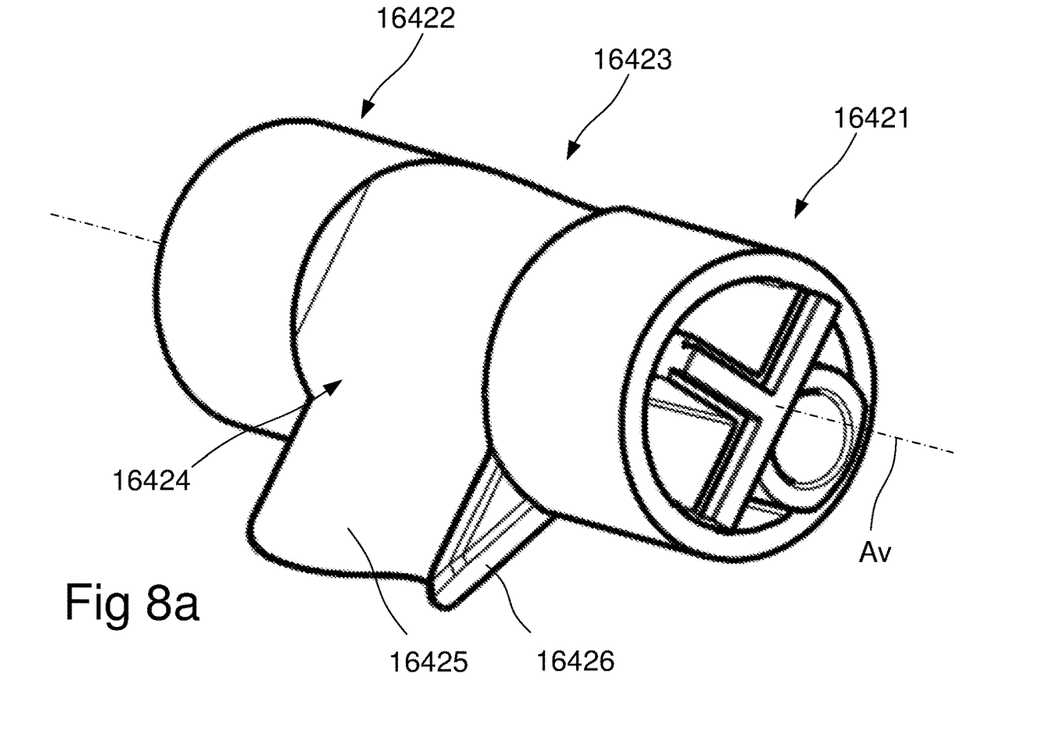
Figure 8B:
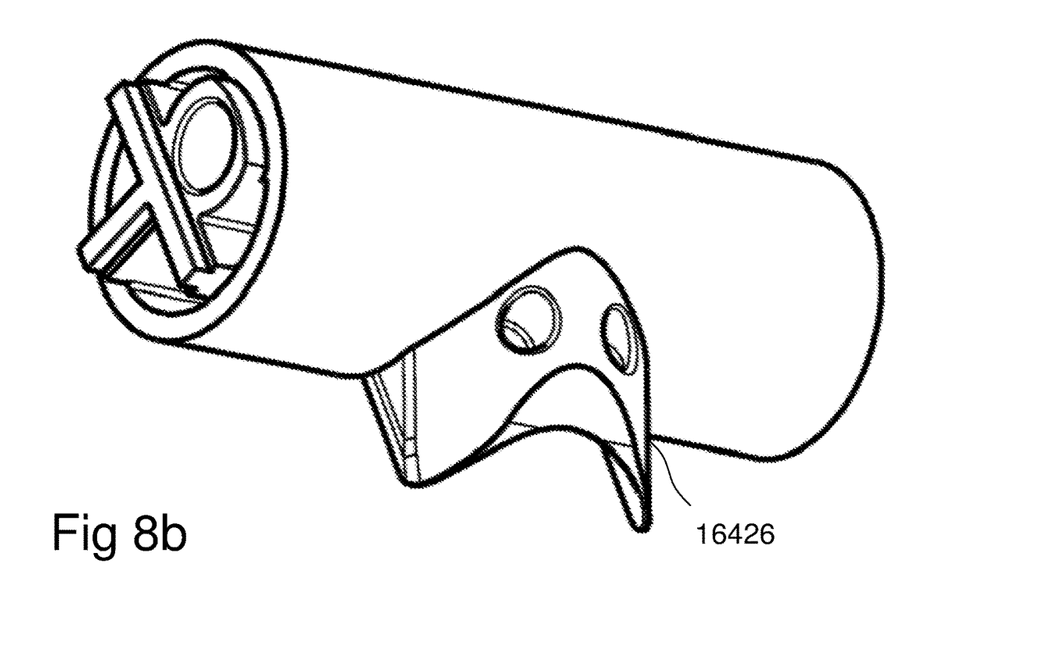

FIGS. 8a-8b show a valve body according to the second embodiment (FIGS. 4a-4b).

The valve body 1642 comprises two cylindrical portions 46421, 46422 and a third portion 46423 which has a recess 16424 in the cylindrical portion. The recess thus extends inward from the casing surface of the valve body.

The recess 16424 may define a direction which extends substantially perpendicularly to a geometric rotational axis Av of the valve body 1642. The recess may thus form a channel which may be substantially straight and have a substantially constant cross-sectional area, apart from the variation in edges which occurs as a result of the curvature of the portions 16421, 16422.

Viewed in a plane containing the geometric rotational axis Av, the recess may have a shape which corresponds to the shape of the air inlet 1611. For example, this shape may be partially circular, such as semicircular. The shape may extend over the entire width of the valve body, so as to form a channel which runs across the axial direction of the valve body.

Alternatively, the recess may for example have a partially oval or partially polygonal cross-sectional form.

The recess may form a continuous channel, i.e. a channel which, viewed in its flow direction, is fully surrounded by the valve body material at least at some portion along the flow direction.

Alternatively and as shown, the recess may form an open channel, i.e. a channel which is open along its entire flow direction.

The valve body shown in FIGS. 8a-8b has a protrusion 16426 which protrudes radially from the third portion 16423 and forms an extension of the channel of the recess 16424. Thus the limiting surface 16425 of the channel may extend away from the radially outer portion of the cylindrical portion.

The protrusion may thus have a width in the axial direction of the valve body which corresponds at least to the width of the first air inlet portion 1611, and a length in the radial direction of the valve body which amounts to 10 to 50% of the diameter of the cylindrical portions 16421, 16422 of the valve body.

Figure 9A:
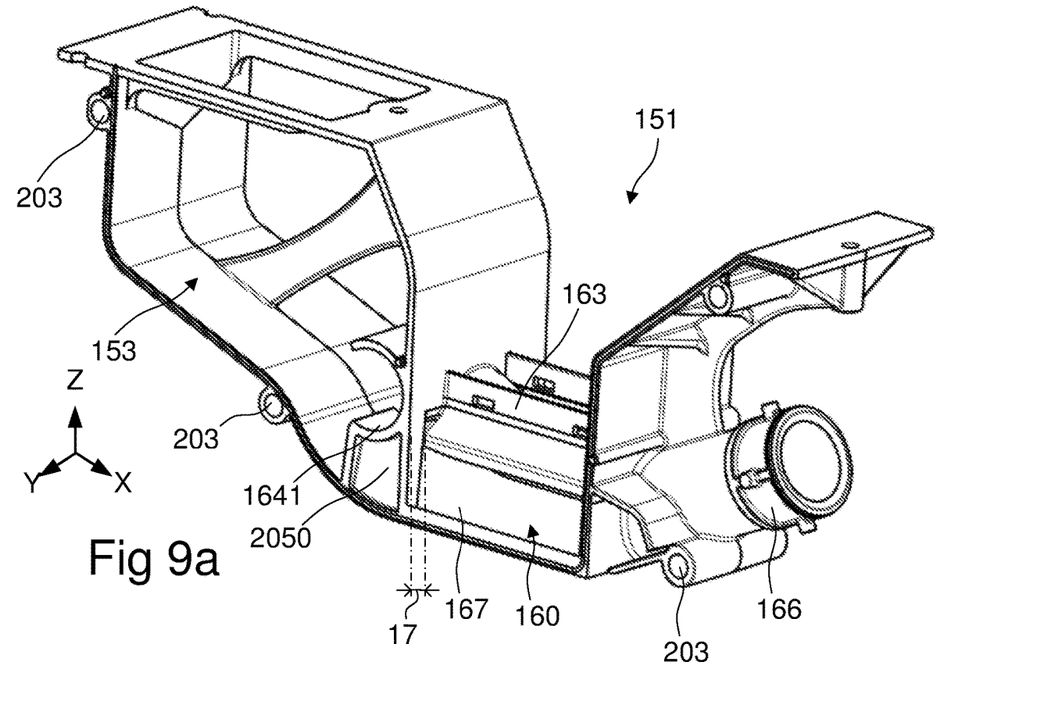
Figure 9B:
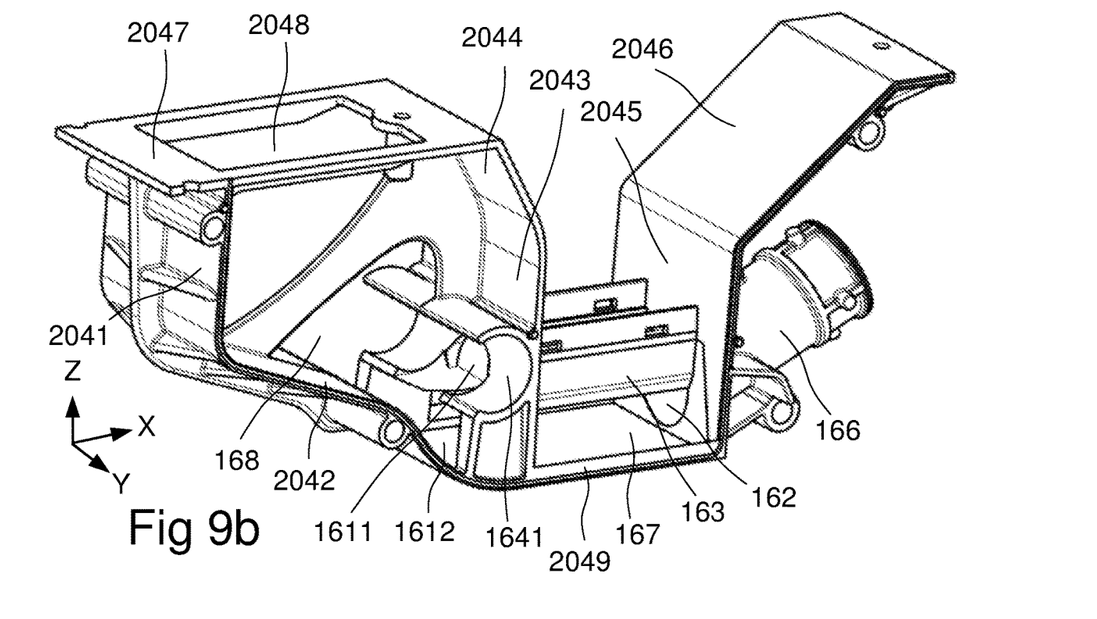

FIGS. 9a-9b show the frame 20 of the material pickup module. The frame may be formed by a single injection-moulded part or by two injection-moulded parts which are joined together.

The material pickup module frame 20 comprises a first portion which forms a common feed channel 168 for air; an air inlet portion which comprises the air inlet 1611, 1612 and the valve seat 1641; a space which forms a material pickup zone 160 and has openings 167 at the side; and the intermediate space 17 which, together with a corresponding intermediate space of the adjacent material pickup module frame 20, forms the intermediate space into which material falls down from the container via the material inlet 151; a roof 163 which defines the horizontal extension of the material pickup zone; and a material outlet 162 which is connected to an outlet channel 166.

The material pickup module frame 20 may be provided with a plurality of continuous mounting holes 203, which are adapted in shape and size to receive the rods 192 that align and hold together a set of material pickup module frames 20.

The material pickup module frame 20 may comprise a first substantially vertical wall portion 2041, a second wall portion 2042 that slopes between 30 and 60 degrees relative to a vertical direction Z, a third substantially vertical wall portion 2043 which transforms into a fourth wall portion 2044 that slopes between 45 and 80 degrees relative to the vertical direction—and hence forms a first slide surface which conducts material from the material inlet 151 down to the material pickup modules 16—, and a substantially horizontal roof portion 2047; wherein these portions together define the form of the feed channel 168.

The air inlet 1611, 1612 may be located at a transition between the second and third wall portions, so that the second wall portion slopes downward from the first wall portion 2041 towards the air inlet 1611, 1612. The third wall portion 2043 may extend upward from the air inlet 1611, 1612.

The roof portion 2047 connects the upper portions of the first and third wall portions. The roof portion 2047 may have an opening 2048 for the supply of air to the feed channel 168.

The roof 163 extends between the air inlet 1611, 1612 and a fifth wall portion 2045 in which the outlet 162 is formed. The fifth wall portion 2045 may extend substantially vertically Z and transform into a sixth wall portion 2046 that slopes by approximately 30 to 70 degrees relative to the vertical direction Z and thus forms a second slide surface, which conducts material from the material inlet 151 downward towards the material pickup modules 16.

One or more reinforcing elements 2049 may be formed parallel with the roof 163. These may be situated at the bottom portion of the material pickup module frame 20 and extend on either side of the material pickup zone 160 and between the inlet 1611, 1612 and the outlet 162, so as to form a lower edge for the opening 167. The upper edge for the opening 167 may be formed by the lower edges of the roof 163.

FIGS. 9*a* and 9*b* also show the construction of the valve seat 1641. The valve seat 1641 is generally formed as a partially cylindrical surface, wherein a sector corresponding to less than 200 degrees has been removed. Preferably, the valve seat 1641 has a partially cylindrical surface corresponding to 185-280 degrees, preferably 200-270 degrees. This partially cylindrical surface extends over the entire width of the material pickup module frame 20.

The material inlet 1611, 1612 may be laterally delimited by side walls 2050 so that each material pickup zone has a single inlet.

Alternatively, one or both of the side walls may be removed so that two or more material pickup zones may have a common air inlet.

It is possible to allow the partial cylinder in which the valve body is rotatable to transform into a fully cylindrical surface, for example at the axial ends of the valve seat 1641, viewed in the Y direction.

At the centre of the valve seat 1641, viewed in the width direction Y of the material pickup module frame 20, a first opening is produced which corresponds to the first air inlet portion 1611. The opening has a width which substantially corresponds to the width of the material pickup zone 160.

Below the valve seat 1641 is a second opening which constitutes the second air inlet portion 1612. This second air inlet portion 1612 is wider than the first air inlet portion 1611 and may extend over substantially the entire width, preferably 80 to 99% of the width, of the material pickup module frame 20.

The roof 163, the width of which substantially corresponds to the width of the material pickup zone 160, may have a width which corresponds to 40-70%, preferably 50-60% of the width of the material pickup module frame 20.

The invention claimed is:

1. Device for airflow-assisted feeding of granular material in an agricultural implement, comprising:
    an air inlet,
    a material inlet, and
    an outlet for material-laden airflow,
    a roof, the horizontal extension of which defines a material pickup zone,
    wherein the material inlet, air inlet and outlet connect to the material pickup zone,
    wherein the device furthermore comprises an air inlet valve comprising a valve seat and a valve body,
    wherein the valve body is rotatable about a geometric axis which is substantially perpendicular to a flow direction at the air inlet; and
    wherein the valve body has a first part which is substantially cylindrical and a second part which comprises a recess forming a channel across the geometric axis, wherein the second part can be aligned with the air inlet.

2. Device according to claim 1, wherein the material pickup zone has a substantially horizontal floor surface.

3. Device according to claim 1, wherein the material inlet is open in a direction transversely to a flow direction from the air inlet to the outlet.

4. Device according to claim 1, wherein the material inlet is open on both sides of a flow path from the air inlet to the outlet.

5. Device according to claim 1, wherein the roof has a downwardly extending wall portion, a lower edge of which constitutes an upper limit of the material inlet.

6. Device according to claim 1, wherein the valve seat has a substantially part-cylindrical surface.

7. Device according to claim 1, wherein the recess, viewed in a plane containing the rotational axis of the valve body, has a cross-sectional form which corresponds to a cross-sectional form of the air inlet.

8. Device according to claim 7, wherein the valve body has a protrusion which extends across the geometric axis and forms an extension of at least a part of the cross-sectional form of the recess.

9. Meter housing for airflow-assisted feeding of granular material to at least two distribution units in an agricultural implement, comprising:
    at least two devices according to claim 1 which are arranged side by side,
    wherein the outlet from each device is connectable to at least one respective distribution unit, and
    wherein the roofs of the devices are situated at a sufficient distance from each other for the material to be able to fall down between the roofs of the devices and on to the material inlet of the devices.

10. Meter housing according to claim 9, wherein a floor of the meter housing forms a common floor for said at least two devices.

11. Meter housing according to claim 9, wherein the valve bodies of the devices are coupled together so that their rotations are mutually synchronized.

12. Meter housing according to claim 9, wherein the valve bodies of the devices have a common rotational axis.

13. Meter housing according to claim 9, wherein the roofs of the devices are separated by a gap which leads to the material inlet of the devices.

14. Agricultural implement for feeding granular material to the ground over which the agricultural implement travels, comprising:
 a central container for the granular material,
 a meter housing according to claim 9,
 wherein the meter housing is connected to the container such that material present in the container is fed to the meter housing by force of gravity,
 a fan which is connected to the meter housing for generating an airflow to the air inlet,
 at least two distribution units which are located at a distance from the meter housing,
 wherein each outlet from the meter housing is connected to at least one of the distribution units via a respective channel.

15. Method for airflow-assisted feeding of granular material in an agricultural implement, comprising:
 providing a material pickup zone, the extension of which, viewed in the horizontal plane, is defined by a roof above the pickup zone,
 providing an airflow through the material pickup zone in a direction towards an outlet from the material pickup zone,
 feeding the material by gravity to the material pickup zone, so that the material slides into the material pickup zone in a direction across the airflow,
 providing an air inlet valve comprising a valve seat and a valve body, wherein the valve body has a first part which is substantially cylindrical and a second part which comprises a recess forming a channel across a geometric axis, wherein the second part can be aligned with the air inlet;
 turning the valve body about the geometric axis which is substantially perpendicular to a flow direction at the air inlet so as to control a flow area for the airflow to the material pickup zone, and
 conducting the material-laden airflow from the outlet to at least one distribution unit.

\* \* \* \* \*